Aug. 23, 1927.
G. R. BOTT
1,639,684
MOUNTING FOR ANTIFRICTION BEARINGS
Filed July 10, 1926
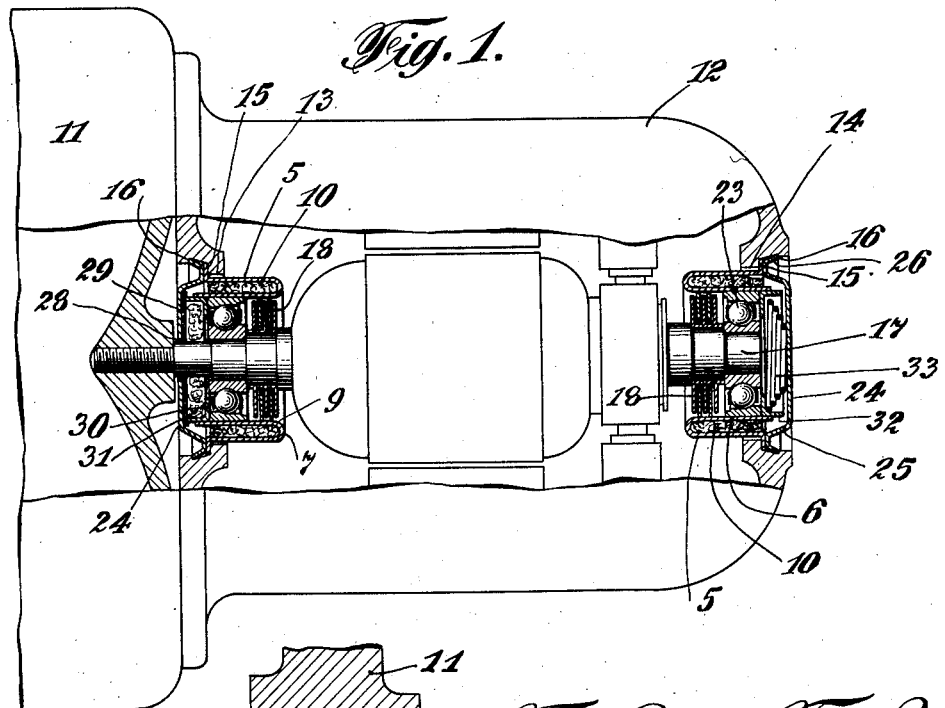
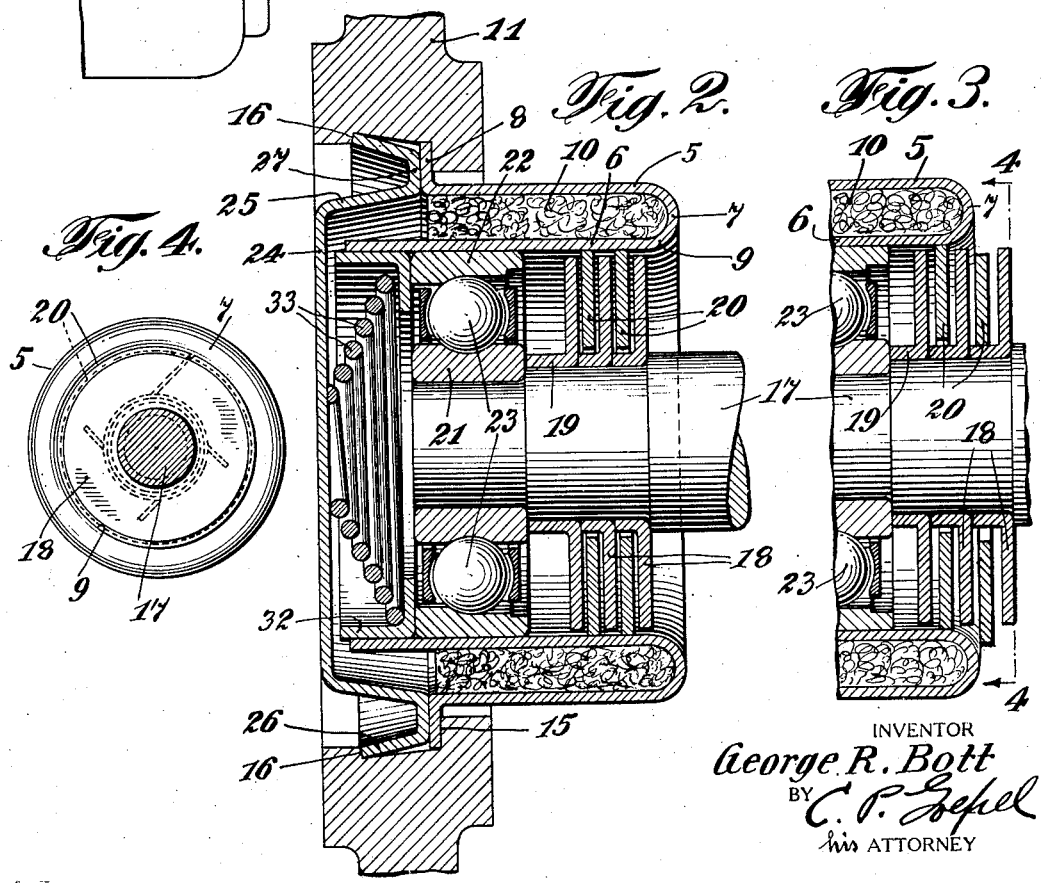
INVENTOR
George R. Bott
BY C. P. Zefiel
his ATTORNEY Patented Aug. 23, 1927.

1,639,684

UNITED STATES PATENT OFFICE.

GEORGE R. BOTT, OF STAMFORD, CONNECTICUT, ASSIGNOR TO NORMA-HOFFMANN BEARINGS CORPORATION, OF STAMFORD, CONNECTICUT, A CORPORATION OF NEW YORK.

MOUNTING FOR ANTIFRICTION BEARINGS.

Application filed July 10, 1926. Serial No. 121,521.

This invention relates to mountings for anti-friction bearings, and has for its primary object to provide means whereby the bearing and the several parts constituting the improved mounting may be rapidly, easily and accurately assembled, and wherein certain novel features of construction are embodied resulting in practically noiseless operation of the bearing with maximum efficiency at high speeds and providing for the ready adaptability of the improved mounting to various applications of such anti-friction bearings, compactness and durability thereof and enabling the several parts to be fabricated at comparatively low cost.

With the above and other objects in view, my present invention consists in the improved mounting for anti-friction bearings and in the form, construction and relative arrangement of the several parts thereof as will be hereinafter more fully described, illustrated in the accompanying drawings, and subsequently incorporated in the subjoined claims.

In the drawings, wherein I have illustrated one practical application of a preferred embodiment of my present improvements, and in which similar reference characters designate corresponding parts throughout the several views.—

Figure 1 represents an adaptation of the subject matter of the present application to the armature shaft of a small electric motor, such as is generally used in connection with vacuum cleaners, the motor housing being broken away and partly shown in section;

Fig. 2 is an enlarged sectional view of my improved mounting;

Fig. 3 is a fragmentary sectional view similar to Fig. 2, more particularly illustrating one important feature of the invention in connection with the application of the dust excluding means to the bearing receiving casing, and Fig. 4 is a sectional view taken on the line 4—4 of Fig. 3.

Certain features included herein and which will be later referred to in greater detail, are disclosed and broadly claimed in prior applications for patents filed by me on May 18, 1926, Serial No. 109,815, and May 24, 1926, Serial No. 111,168, respectively. It is one of the principal aims of my present improvements to materially simplify and increase the efficiency of the sheet metal bearing receiving casing and the vibration dampening or absorbing means together with the means for attaching the same in applied relation to a supporting wall or other part as disclosed in the application last above referred to. Incidental to such improvements, I have also produced a simple and effective means for automatically contracting the split dust excluding washers as shown in the application first above identified and guiding and directing the same to their applied positions as the shaft end with the bearing fitted thereon is inserted within the enclosing casing.

To the above ends, in the structural embodiment of the invention shown in the accompanying drawing, the combined bearing enclosing casing and vibration dampening means is fabricated from a single sheet of metal. This original metal sheet is formed in suitable dies to provide the outer wall 5 and a reentrant inner wall 6. The bend 7 in the metal sheet connecting these walls with each other is of substantially semi-circular form and presents a continuous outer convex surface merging into the surfaces of the walls 5 and 6 respectively. Normally these walls extend in substantially parallel relation to each other, and at its opposite end the outer wall 5 is provided with the outwardly projecting annular flange 8. The inner wall 6 projects an appreciable distance beyond this flange 8. This inner wall 6 thus provides a cylindrical metallic shell open at its opposite ends, and capable of a certain amount of resilient or elastic movement relative to the outer wall 5, said inner cylindrical wall thus resiliently vibrating from an annular fulcrum in the bent connecting portion 7 between said inner and outer walls approximately at the point indicated at 9. In other words, this inner reentrant tubular wall 6 of the sheet metal bearing supporting casing functions in a manner similar to a cantilever member which is highly effective for the purpose of dampening and absorbing vibratory motion.

As additional means for absorbing vibration in the bearing supported by the tubular wall 6, I preferably arrange between said wall and the outer wall 5 a body of hard grease, or felt or laminated paper imbedded in grease as indicated at 10 and which I have found to be very effective for this purpose.

In the illustrated example I have shown my improvements as applied to a small type of electric motor as used in connection with vacuum cleaners and other household appliances, and in Fig. 1 the fan casing is indicated at 11 and the motor housing at 12. The end plate or casting of the casing 11 is centrally formed with the opening 13 and the outer end wall of the housing 12 is provided with a similar opening 14 therein. These openings are of slightly greater diameter than the external diameter of the walls 5 of the bearing receiving casings which said openings are designed to receive. At one side of each opening the supporting wall is provided with an annular seat 15 and at the outer edge of this seat said wall is undercut to provide an annular shoulder 16 in spaced relation to said seat 15. The purpose of this construction will presently appear.

The armature shaft of the electric motor indicated at 17 is suitably formed, ground or turned at its opposite ends to provide portions of different diameters, one of which is designed to receive the dust excluding means as shown in my co-pending application Serial No. 109,815, above referred to. This dust excluding means includes a series of annular plates 18 each of which has a hub extension 19 whereby said plates are spaced from each other upon the shaft. Between these plates the split washers 20 are arranged. As clearly shown in Fig. 3 of the drawings, normally these washers are of somewhat greater diameter than the internal diameter of the inner wall 6 of the bearing enclosing casing but are diametrically contractible, due to the split construction, and are adapted to have a more or less tight hugging frictional engagement at their outer edges with said wall.

The anti-friction bearing which is adapted to be arranged upon the shaft and outwardly of the dust excluding means may be of any preferred type. I have herein shown a conventional open type ball bearing including the inner ring 21, and an outer ring 22, said rings having suitably formed raceways to receive the anti-friction members or balls 23.

For the purpose of securely retaining the bearing receiving casing in its applied position and closing one end thereof, I provide a sheet metal cap plate 24 which is angularly bent or stamped to provide a dished body having a flared marginal wall 25 and a reversely inclined or outwardly flaring flange 26 at the outer edge of said marginal wall. This flange is resiliently yieldable and is adapted to be applied under pressure and snapped into position under the locking shoulder 16 as clearly shown in Fig. 2 of the drawings. The narrow annular section 27 of the cap plate connecting said flange 16 with the marginal wall 25 of the dished body of the plate has tight bearing clamping engagement against the flange 8 on the end of the outer casing wall 5 and holds the same in close frictional contact upon the annular seating surface 15. Thus, this bearing receiving casing is fixedly held in connection with the supporting wall of the casing or housing without the use of screws or other analogous fastening elements.

The retaining cap 24 which is associated with the end plate of the casing 11 is of course, provided with a central opening 28 therein to receive the projecting end of the armature shaft 17 to which the fan or other part operated by the motor is attached. Also, in connection with the bearing at this end of the motor shaft, a fiber washer or disc 29 is inserted within the retaining or cover cap 24 before it is snapped into position, and a follower cup 30 and felt washer 31 is interposed between this fiber washer and the outer bearing ring 22. At the opposite end of the motor shaft, the follower cup 32 is resiliently urged against the outer bearing ring by the conical coil spring 33 which bears at its smaller end against the cover or retaining cap 24 and serves to automatically adjust the bearings and compensate for any over-all assembly tolerances of the parts. Assuming that the end plate of the casing 11 and the end wall of the housing 12 have been properly provided with the openings 13, seats 15 and the shoulders 16, my improved bearing mountings for the armature shaft of the motor with the several parts thereof ready for assembly are applied as follows: First, one of the double walled bearing receiving casings is inserted through each of the openings 13 and 14 respectively, and the flanges 8 engaged upon the seats 15. By means of a suitable press, the retaining cap 24 having the fiber disc 29 first arranged therein is applied and the flange 26 thereof is snapped into position under the shoulder 16, thereby locking the bearing receiving casing against movement relative to the supporting wall. Similarly, the other cap plate 24 is applied within the end of the opening in the wall of the housing 12 to lock the other bearing receiving casing in connection therewith.

Having supplied the opposite ends of the motor shaft with the dust excluding washer plates and with the anti-friction bearings as above explained, the felt washer 31 and follower cup 30 are then inserted against the fiber disc 29 and the spring 33 and follower cup 32 are inserted within the other of the bearing receiving casings at the end of the motor housing. One end of the motor shaft is then inserted through the opening 28 in the cover plate 24 in the end wall casing 11 and the bearing is moved into the tubular wall 6 of the supporting casing. The outer bearing ring is of such diameter that it has a bearing frictional fit with the face thereof. It will also be observed from reference to Fig. 3 of the drawings, that the normal diameter of the expansible dust excluding washers 20 is greater than the internal diameter of this wall 6 so that as the outer edges of these washers successively strike against the convex surface of the curved connecting portions 7 between the walls 5 and 6, said washers will be contracted and as they tend to resume their normal form, will exert the desired frictional hugging pressure against the face of the tubular wall 6. Therefore, since these contractable washer plates are closely arranged with respect to the relatively fixed plates 18 on the motor shaft, it will be obvious that the entrance of the dust or grit to the interior of the supporting casing and upon the parts of the bearing is precluded.

After thus mounting one end of the armature shaft, the motor housing is applied and the bearing and dust excluding means on the opposite ends of said shaft is positioned in a similar manner within the sheet metal enclosing casing carried by the end wall of said housing. It is only then necessary to fasten or secure the flanged open end of the motor housing to the end wall of the casing 11 in the usual manner. It is, of course, understood that after the bearings are applied in the housing and, in this case, since the bearing is of open type, after the outer ring is inserted into the housing and following the placement of the inner ring with cage on the armature shaft, the several parts are packed or lubricated with a lubricant of the proper consistency. In those types of open type bearings wherein the balls are carried by separate cages arranged between the inner and outer race rings, the outer race rings may first be separately assembled within the respective sheet metal enclosing casings and the inner rings with the cages having the balls therein applied to the commutator shaft.

When the motor is operated at any appreciable speed, the split washer plates 20 will be moved out of contacting engagement with the rotating plates 18 fixed to the commutator shaft so that the motor will be entirely free to operate without requiring any further adjustment. It will be seen that these alternating rotating and stationary washer plates not only effectively exclude the entrance of dust to the bearing supporting casing, but also prevent the escape or loss of the lubricant therefrom. Accordingly, it will be understood that while I have herein illustrated the motor as arranged in a horizontal position, my invention is likewise applicable to a vertical arrangement of the motor, which is frequently adopted especially in connection with vacuum cleaners.

From the above description considered in connection with the accompanying drawings, the construction, manner of use and several advantages of my present improvements will be clearly and fully understood. It will be seen that I have attained in this new system of mounting for anti-friction bearings the utmost simplicity in construction which will enable such bearings to be very rapidly and accurately mounted by the manufacturer of the apparatus to whom they may be supplied by the manufacturer of the bearings, without requiring a high degree of skill upon the part of the workmen. Also, by reason of the improved form and construction of the sheet metal support in which the bearing is directly mounted, I combine in a single part which may be easily fabricated at low cost the functions of an enclosing and supporting casing for the bearing and of a vibration dampening and absorbing means. Thus, in the operation of the motor, vibratory movements of the outer wall of this casing are practically negligible and the clearance relation between this wall and the opening 13 through which said wall extends may be reduced to a minimum with the complete assurance that the bearing will operate with exceeding quietness. Thus, objection on this score even at very high speed operation of the motor is obviated. Further, it will be seen that this new mounting provides in addition to great durability in the structure of its parts, a very compact arrangement thereof so that the mounting in its entirety occupies a relatively small space. Such a mounting is therefore, readily adaptable to various installations where facility in assemblage and disassemblage of the parts, low initial and maintenance costs and maximum efficiency with apparent noiseless operation at all speeds are prime considerations.

As above noted, I have herein described and illustrated by way of an example, an embodiment of the present disclosure which will give satisfactory results in actual use. However, it will be evident to those skilled in the art that the several novel features of my improvements as incorporated in the subjoined claims may be susceptible of embodiment in various other alternative structural forms, and it is accordingly to be understood that I therefore, reserve the privilege of resorting to all such legitimate changes in the form, proportion and relative arrangement of the several elements as may be fairly considered as within the spirit and scope of said claims.

I claim:

1. In combination with a support, a bearing receiving casing adapted to be arranged in projecting relation to the support and engaged at one of its ends therewith, and a retaining member for said casing adapted to be forced under pressure into clamping engagement with the said casing end and having a resiliently yieldable part automatically interlocking with said support to fixedly hold said casing in assembled relation therewith.

2. In combination with a support, a bearing receiving casing adapted to be positioned in projecting relation to the support and having an annular flange on one end for engagement with a seating face on the support, said support being provided with an annular shoulder in spaced relation to said seating face, and a retaining member adapted to be forced under pressure into clamping engagement upon said casing flange and said member having a resiliently yieldable flange automatically interlocking with said shoulder to fixedly hold the casing in assembled relation with the support.

3. In combination with a support having an opening, a bearing receiving casing adapted to be positioned through said opening and having means on one end to engage said support, and a retaining and cover plate insertable under pressure into said opening into cooperative engagement with said means, said plate having resiliently yieldable marginal means interlocking with said support to fixedly hold the casing in assembled relation therewith.

4. In combination with a support having an opening and provided in the edge of said opening with an annular seating face and an annular shoulder in spaced relation to each other, a bearing receiving casing adapted to be positioned through said opening and having an annular flange on one end for engagement with said seating face, and a retaining and cover plate insertable under pressure into said opening to clampingly engage a part thereof with said casing flange, and said plate having a marginal annular flange resiliently yieldable by coaction with the edge of said opening as the plate is inserted and automatically interlocking with the shoulder on said support to fixedly hold the casing in assembled relation therewith.

5. In combination, a bearing receiving casing having a reentrant wall spaced from the outer casing wall, and forming a vibration dampening support for the bearing, a bearing supported by the inner casing wall, and oil retaining and dust excluding means positioned within the inner casing wall, alongside the bearing.

6. A sheet metal casing for anti-friction bearings having a reentrant wall spaced from the outer casing wall and constituting a vibration dampening support for the bearing.

7. A sheet metal casing for anti-friction bearings having a reentrant wall spaced from the outer casing wall and resiliently responsive to vibratory motion of the bearing, and said outer wall of the casing having means at one end for attachment to a support.

8. A unitary sheet metal casing for anti-friction bearings having inner and outer walls integrally connected at one of their ends and said inner wall directly receiving the bearing and constituting a resiliently yieldable vibration dampening support therefor.

9. A unitary sheet metal casing for anti-friction bearings having inner and outer walls integrally connected at one of their ends and said inner wall directly receiving the bearing and constituting a resiliently yieldable vibration dampening support therefor, and vibration absorbing means intesposed between the said casing walls.

10. A unitary sheet metal casing for anti-friction bearings having inner and outer walls integrally connected at one of their ends and said inner wall directly receiving the bearing and constituting a resiliently yieldable vibration dampening support therefor, and a vibration absorbing medium substantially completely filling the space between said casing walls.

11. A unitary sheet metal casing for anti-friction bearings having inner and outer walls integrally connected at one of their ends and said inner wall directly receiving the bearing and constituting a resiliently yieldable vibration dampening support therefor, and said outer casing wall at its other end having means for attachment to a support.

12. A sheet metal casing for anti-friction bearings having a reentrant wall spaced from the outer casing wall and connected therewith by a wall section having a convex surface, said surface constituting means for guiding and directing the bearing to its applied position and said reentrant casing wall providing a resiliently yieldable vibration dampening support for the bearing.

13. A sheet metal casing for anti-friction bearings having a reentrant wall spaced from the outer casing wall and connected therewith by a wall section having a convex surface, said surface constituting means for guiding and directing the bearing to its applied position and said reentrant casing wall providing a resiliently yieldable vibration dampening support for the bearing, and a vibration absorbing medium interposed between said casing walls.

14. A sheet metal casing for anti-friction bearings having means at one of its ends adapted for attachment to a support, said casing adapted to receive the anti-friction bearing, and oil retaining and dust excluding means comprising alternately arranged movable plates and stationary washers, the washers being split so as to be diametrically contractible, the washers being adapted to be forced under pressure into the other end of the casing, and said casing at the latter end thereof having a curvilinear wall section presenting a convex surface to cooperate with said washers and contract the same when inserted into the casing and thereby cause a close frictional engagement of the washers with the inner surface of the casing wall.

15. A sheet metal casing for anti-friction bearings having a reentrant wall spaced from the outer casing wall and connected therewith by a curved section of the metal sheet presenting a convex outer surface, means for attaching said casing to a support including a retaining and cover plate closing the other end of the casing, said reentrant casing wall adapted to receive an anti-friction bearing and oil retaining and dust excluding means, and said bearing and the dust excluding means being guided and directed by said convex surface to applied position within said casing, and said reentrant wall of the casing constituting a resiliently yieldable vibration dampening support for the bearing.

16. A sheet metal casing for anti-friction bearings having a reentrant wall spaced from the outer casing wall and connected therewith by a curved section of the metal sheet presenting a convex outer surface, means for attaching said casing to a support including a retaining and cover plate closing the other end of the casing, said reentrant casing wall adapted to receive an anti-friction bearing and oil retaining and dust excluding means, and said bearing and the dust excluding means being guided and directed by said convex surface to applied position within said casing, and said reentrant wall of the casing constituting a resiliently yieldable vibration dampening support for the bearing, and a vibration absorbing medium substantially filling the space between said outer and inner casing walls.

17. In combination, a bearing receiving casing having a reentrant wall spaced from the outer casing wall, and forming a vibration dampening support for the bearing, a bearing supported by the inner casing wall, and oil retaining and dust excluding means comprising alternately arranged movable and stationary elements positioned within the inner casing wall, alongside the bearing.

18. In combination, a bearing receiving casing having a reentrant wall spaced from the outer casing wall, and forming a vibration dampening support for the bearing, a bearing supported by the inner casing wall, and oil retaining and dust excluding means comprising alternately arranged interlaced movable plates and stationary split washers which are diametrically contractible, positioned within the inner casing wall, alongside the bearing.

In testimony that I claim the foregoing as my invention, I have signed my name hereto.

GEORGE R. BOTT.